(12) United States Patent
Lee

(10) Patent No.: US 7,435,019 B2
(45) Date of Patent: Oct. 14, 2008

(54) SECURITY CAMERA

(75) Inventor: Woon-ho Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 417 days.

(21) Appl. No.: 11/367,309

(22) Filed: Mar. 6, 2006

(65) Prior Publication Data
US 2007/0041726 A1 Feb. 22, 2007

(30) Foreign Application Priority Data
Aug. 19, 2005 (KR) ........................ 10-2005-0076483

(51) Int. Cl.
G03B 17/00 (2006.01)
H04N 5/225 (2006.01)
(52) U.S. Cl. ...................... 396/427; 348/373
(58) Field of Classification Search ................. 396/419, 396/427; 348/208.3, 151, 373, 375
See application file for complete search history.

(56) References Cited

U.S. PATENT DOCUMENTS

| 5,394,209 | A | * | 2/1995 | Stiepel et al. | ................. 396/20 |
| 6,262,361 | B1 | | 7/2001 | Konz | |
| 6,768,233 | B2 | | 7/2004 | Angerpointner | |
| 6,793,415 | B2 | * | 9/2004 | Arbuckle | ................. 396/427 |
| 6,850,025 | B1 | * | 2/2005 | Paolantonio et al. | ........ 318/685 |
| 2006/0147194 | A1 | * | 7/2006 | Jones | ................. 396/427 |
| 2007/0053681 | A1 | * | 3/2007 | Arbuckle | ................. 396/427 |

FOREIGN PATENT DOCUMENTS

| CN | 1198269 | 11/1998 |
| JP | 2001-174902 | 6/2001 |
| JP | 2003-234925 | 8/2003 |
| KR | 20-2000-0020700 | 9/2000 |
| KR | 1020010111761 | 12/2001 |
| KR | 20-0273675 | 1/2002 |
| KR | 20-0320712 | 7/2003 |

* cited by examiner

*Primary Examiner*—Patrick Assouad
*Assistant Examiner*—Autumn Parker
(74) *Attorney, Agent, or Firm*—Roylance, Abrams, Berdo & Goodman, L.L.P.

(57) ABSTRACT

The disclosed security camera includes a case body mounted on a fixed wall. A top plate is rotatably installed at one side of the case body. A movable circuit board is installed at one side of the top plate. A fixed circuit board is fixed in the case body. A camera unit is installed at the other side of the top plate. A coupling cable connects the movable circuit board and the fixed circuit board. A slip ring supports the coupling cable without being influenced by rotation of the top plate. A wire guide substantially prevents movement of the coupling cable drawn from an upper side of the top plate. A wire guide includes a wire drawing section through which the coupling cable passes. Fixing ribs are provided at one side of the wire guide to fix the coupling cable drawn through the wire drawing section to the upper surface of the top plate. The fixing ribs are installed at a certain interval to fix a core inserted around the coupling cable.

20 Claims, 8 Drawing Sheets

SECURITY CAMERA

CROSS-REFERENCE TO RELATED APPLICATIONS

This application claims the benefit under 35 U.S.C. § 119 (a) of Korean Patent Application No. 2005-76483, filed Aug. 19, 2005, the entire contents of which are hereby incorporated by reference.

BACKGROUND OF THE INVENTION

1. Field of the Invention

The present invention relates to a security camera. More particularly, the present invention relates to a security camera with an improved coupling structure of a coupling cable that connects a fixed circuit board and a movable circuit board.

2. Description of the Related Art

Generally, security cameras are used to prevent illegal acts, such as robberies, in places, such as houses, parking lots, department stores, banks and exhibition halls.

The security camera described above may be classified as a fixed type camera capable of watching one fixed area or as a movable type camera employing a pan tilt motor and capable of watching a wider area.

The problem with fixed type cameras is that a multiple number of cameras are required to watch the areas with different angles in one space since it is impossible to change the angle of the fixed type camera. Accordingly, movable type cameras tend to be preferred to fixed type cameras.

An example of a movable type camera is disclosed in Japanese patent publication No. 2001-174902. FIG. 1 is a view that shows the composition of the security camera disclosed in Japanese patent publication No. 2001-174902.

Referring to FIG. 1, various electrical components in a rotatable case 5 are connected through coupling cables 5L to a circuit board (not shown) in a base 7 installed at a place, such as a ceiling.

For the movable type camera described above, the coupling cable 5L that connects various electrical components in the rotatable case 5 to the circuit board in the base 7 needs to be installed securely without being influenced by the rotating camera unit.

Accordingly, a need exists for a movable type camera having an improved coupling structure for a coupling cable that connects a fixed circuit board and a movable circuit board.

SUMMARY OF THE INVENTION

An object of the present invention is to provide a security camera with an improved coupling structure of a coupling cable, which connects a fixed circuit board in a case body with a movable circuit board in a camera section.

According to an exemplary embodiment of the present invention, the security camera may include a case body, a top plate rotatably installed at one side of the case body, a fixed circuit board installed in the case body, and a movable circuit board installed at one side of the top plate. A camera unit is installed at the other side of the top plate. A coupling cable connects the movable circuit board and the fixed circuit board. A slip ring supports the coupling cable without being influenced by rotation of the top plate. A wire guide fixes the coupling cable drawn through the upper side of the top plate.

The wire guide includes a wire drawing section through which the coupling cable passes and a fixing section that fixes the coupling cable drawn through the wire drawing section to the upper side of the top plate.

The fixing section is formed substantially perpendicularly to a side of the wire guide and may include a fixing rib that has an insertion groove at its lower end into which the coupling cable is inserted.

A core is inserted around the outer surface of the coupling cable drawn through the wire drawing section of the wire guide. At least two fixing ribs are formed at a certain interval to fix both sides of the coupling cable around which the ferrite core is inserted.

The wire drawing section includes a drawing hole that has a shape substantially corresponding to the shape of a coupling cable connector connected to one end of the coupling cable and a supporting hole that communicates with the drawing hole and supports the coupling cable drawn through the drawing hole.

According to an exemplary implementation, the top plate has a penetrating hole formed at its center and the supporting hole formed at a position corresponding to the penetrating hole.

According to an exemplary implementation, the security camera further includes a boss section that is formed around the supporting hole on the bottom surface of the wire guide and is inserted around the rotational shaft of the slip ring.

The wire guide has coupling holes at both sides. A combining screw passes through each of the coupling holes and connects the wire guide to the top plate.

The wire guide has a connector penetrating section at one side. The connector connected with one end of the coupling cable drawn through the wire drawing section is connected to a connector socket on the movable circuit board through the connector penetrating section.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWING FIGURES

The above aspects and features of the present invention will be more apparent by describing certain exemplary embodiments of the present invention with reference to the accompanying drawings, in which.

Throughout the drawings, the same drawing reference numerals will be understood to refer to the same elements, features, and structures.

DETAILED DESCRIPTION OF EXEMPLARY EMBODIMENTS

A security camera according to one exemplary embodiment of the present invention is described in detail with reference to the annexed drawings. In the following description, detailed descriptions of known functions and configurations incorporated herein are omitted for conciseness and clarity.

Figure 1:
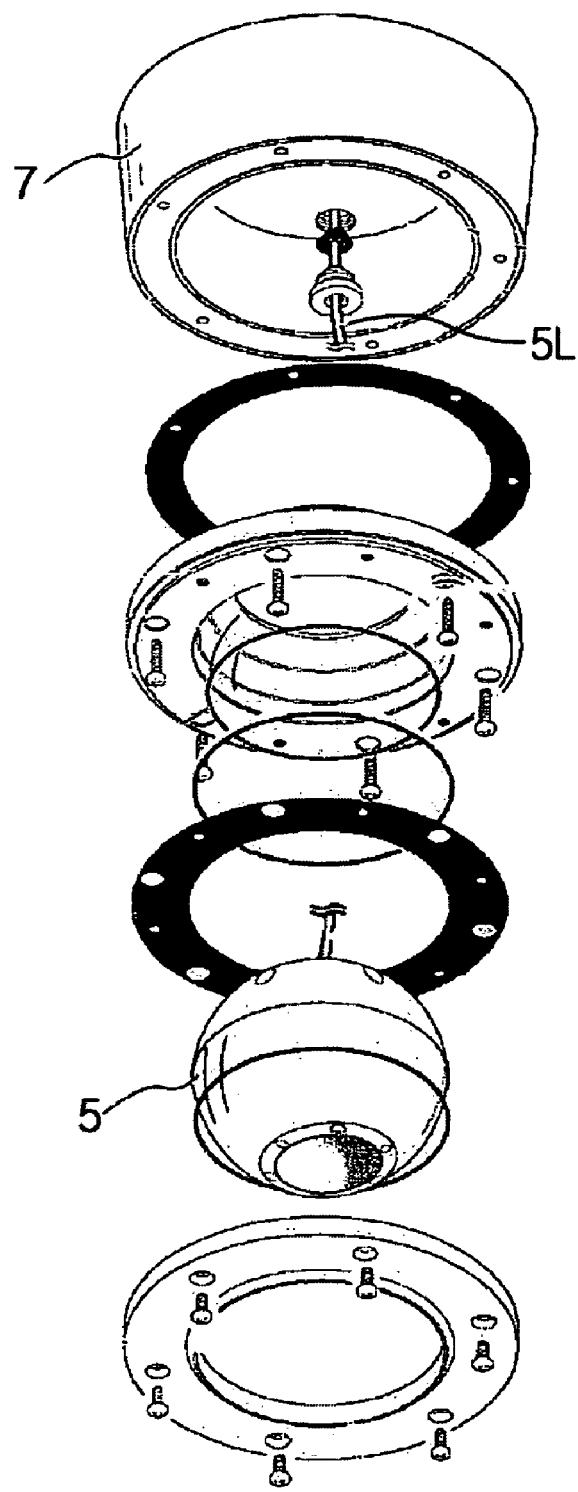
FIG. 1 is a perspective view of the security camera disclosed in the Japanese patent publication No. 2001-174902.
Figure 2:
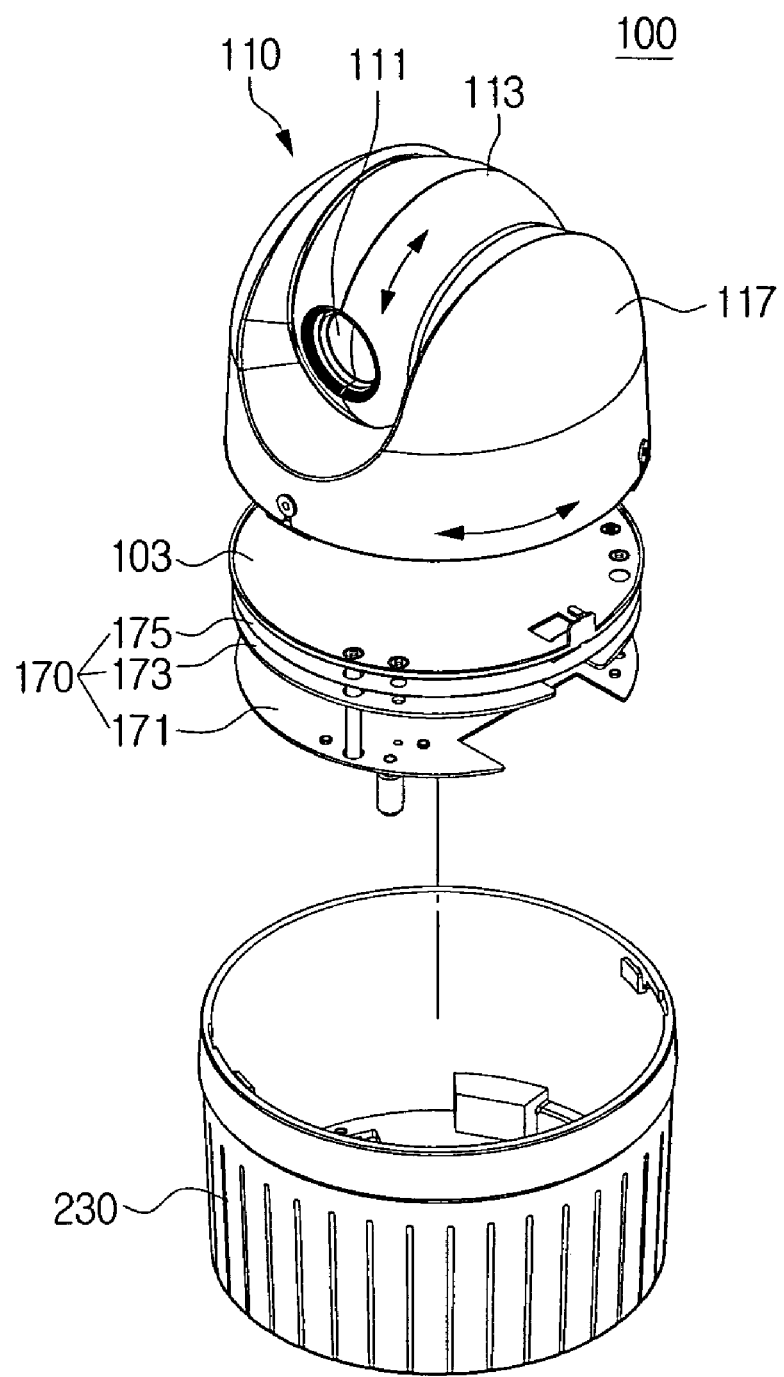
FIG. 2 is a perspective view of a security camera according to an exemplary embodiment of the present invention.

FIG. 2 is a perspective view that shows a security camera according to one exemplary embodiment of the present invention.

Referring to FIG. 2, a security camera 100 according to an exemplary embodiment of the present invention includes a camera unit 110, a power unit 170 and a case body 230.

The camera unit 100 includes a camera lens module 111, a first housing 113 that supports vertical rotation of the camera lens module 111, and a second housing 117 that supports horizontal rotation of the camera lens module 111. The second housing 117 contains the first housing 113 that has the camera lens module 111 in it.

The power unit 170 supplies power required to operate the camera. The power unit 170 includes a bottom plate 171 and a power circuit board 173, which is a fixed circuit board installed above the bottom plate 171. An insulator 175 is installed above the power circuit board 173, and a middle plate 103 is installed above the insulator 175.

The power unit 170 is fixed to the inside bottom of the case body 230. The middle plate 103 rotatably supports the camera unit 110. The case body 230 may be fixed to a ceiling, a wall, or similar support structure.

Figure 3:
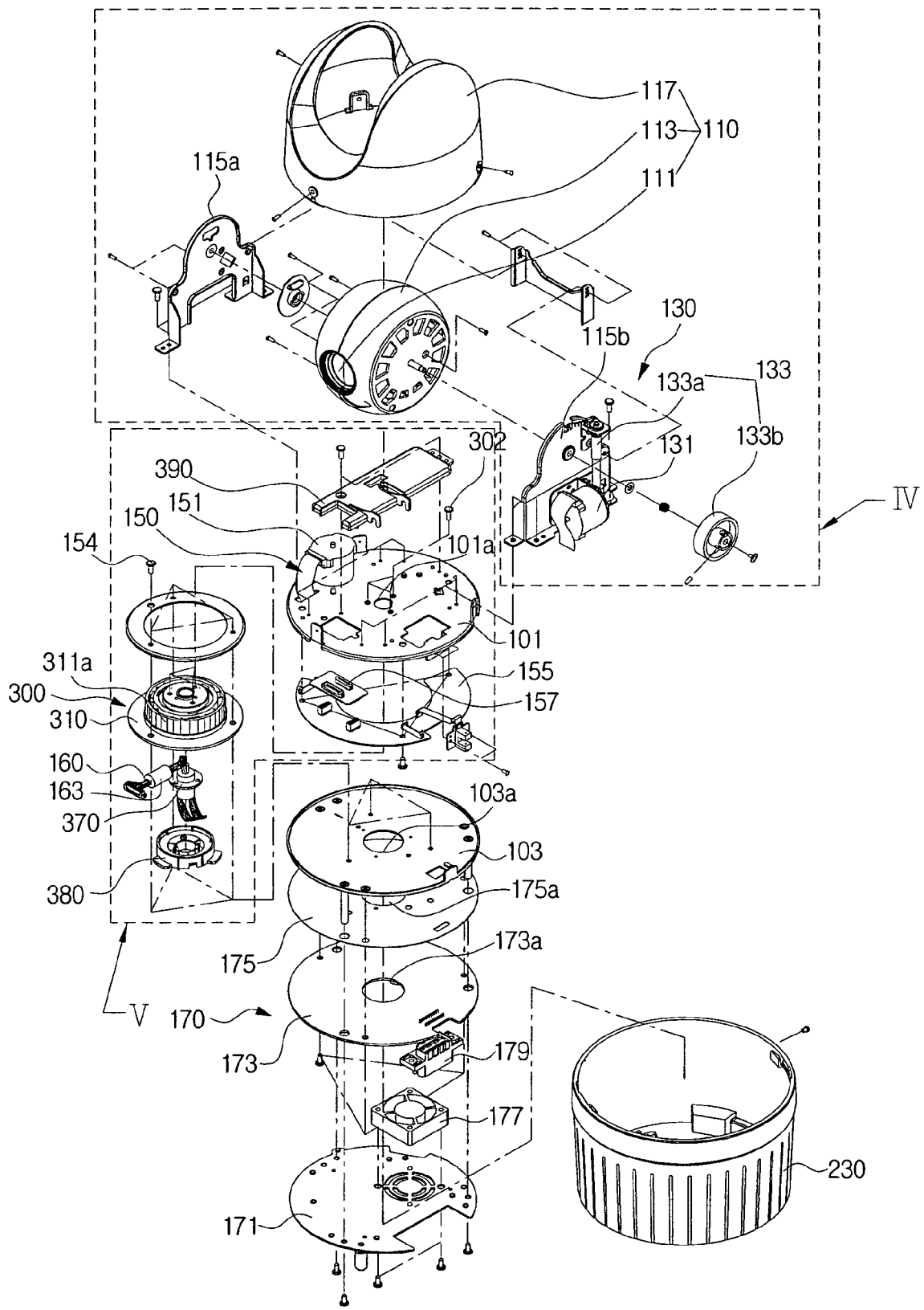
FIG. 3 is an exploded perspective view of the security camera according to an exemplary embodiment of the present invention shown in FIG. 2.
Figure 4:
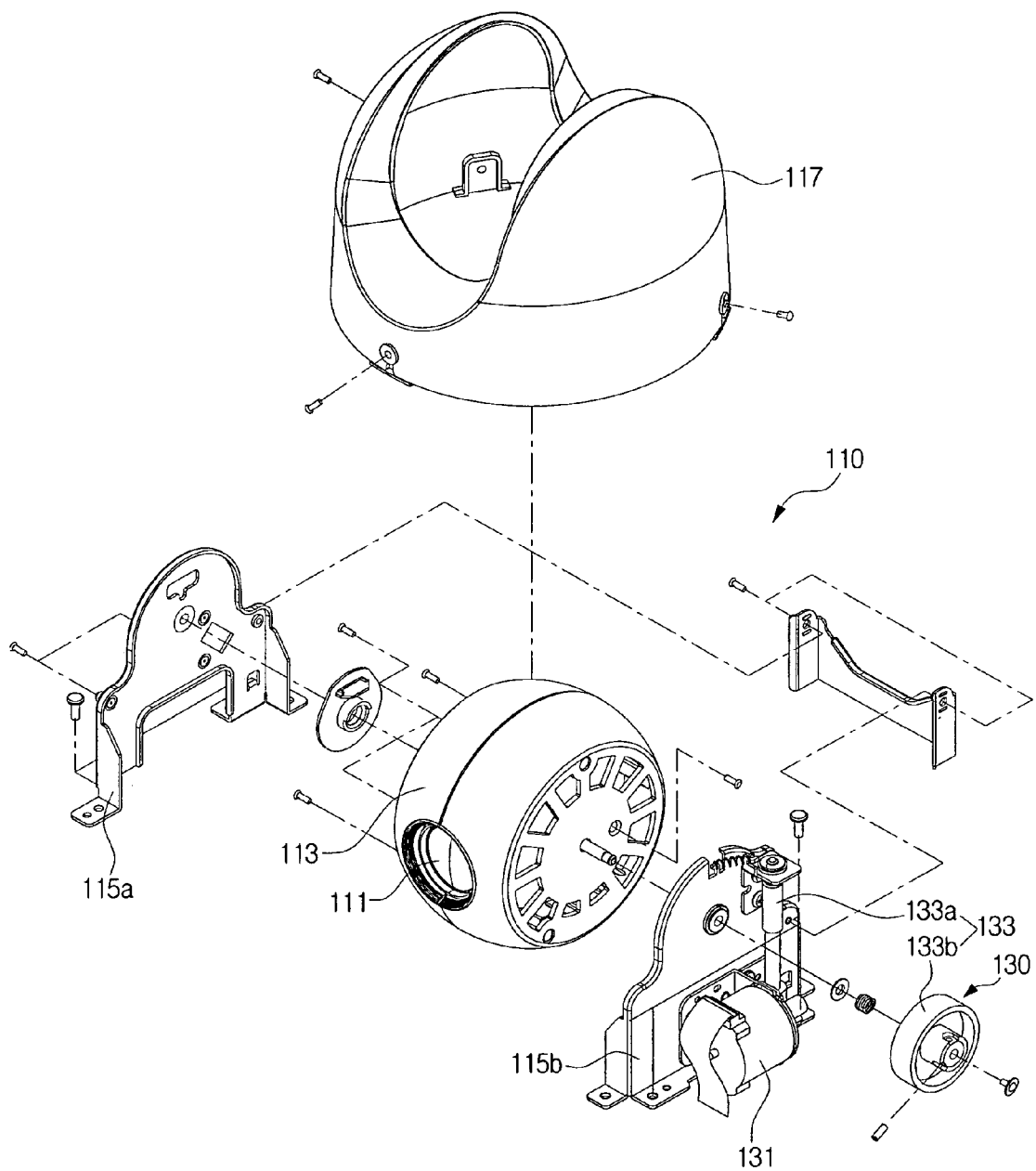
FIG. 4 is an enlarged view of Section IV of FIG. 3.
Figure 5:
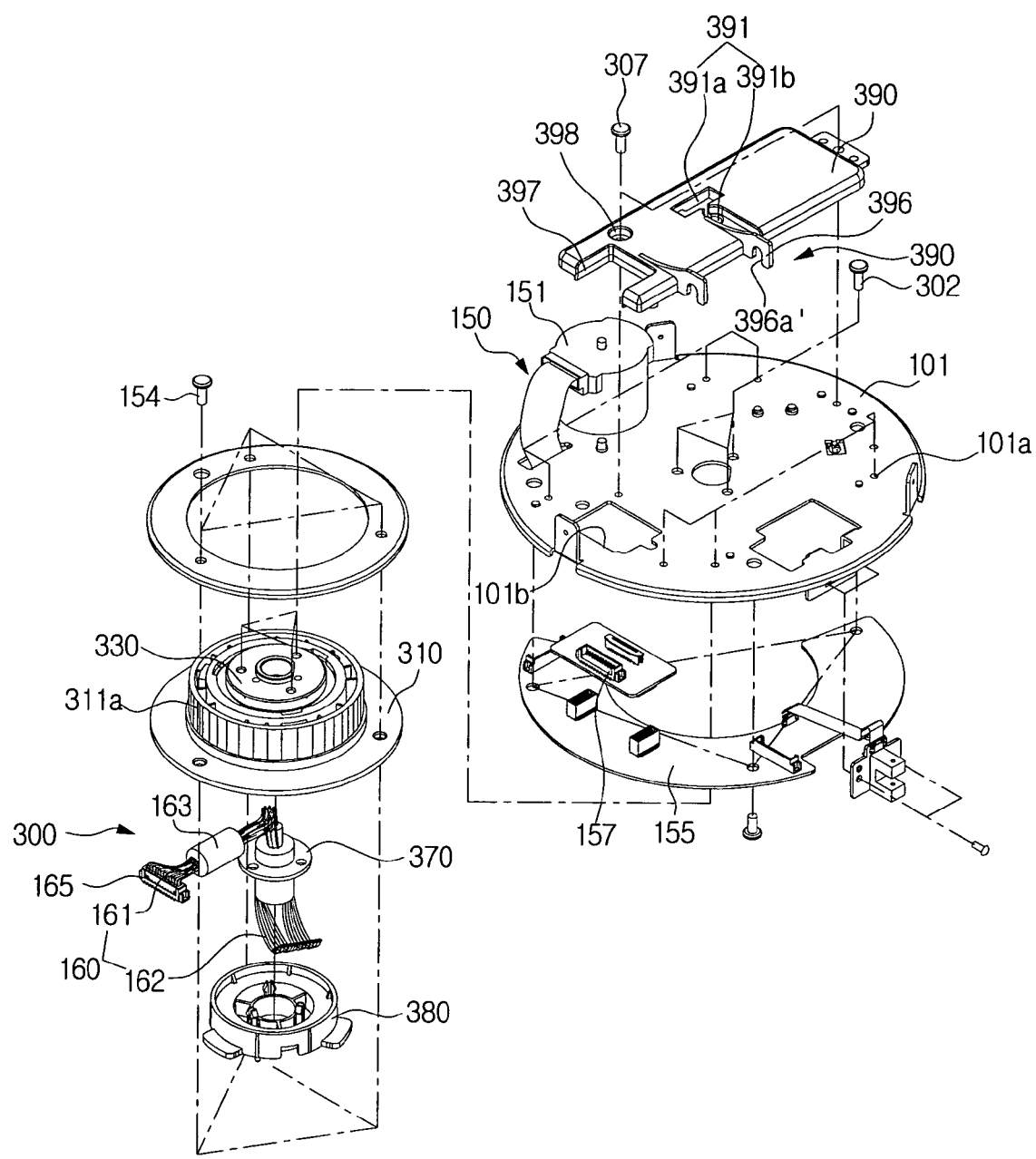
FIG. 5 is an enlarged view of Section V of FIG. 3.

FIG. 3 is an exploded perspective view of the security camera according to an exemplary embodiment of the present invention illustrated in FIG. 2. FIG. 4 is an enlarged view of Section IV of FIG. 3. FIG. 5 is an enlarged view of Section V of FIG. 3.

Referring to FIG. 3, the security camera 100 includes the camera unit 110, a vertical rotation unit 130, a horizontal rotation unit 150, the power unit 170, a slip ring 370, a coupling unit 300 and the case body 230.

Referring to FIGS. 3 and 4, the camera unit 110 is installed on the upper surface of a top plate 101 so that the camera unit may rotate vertically and horizontally. The camera unit 110 includes the first -housing 113 that contains the camera lens module 111, a pair of camera brackets 115a and 115b that support the first housing 113 on the upper surface of the top plate 101, and the second housing 117 that contains the first housing 113 supported by the camera brackets 115a and 115b.

The vertical rotation unit 130 includes a vertical rotation motor 131 mounted to one of the camera brackets 115a and 115b, and a gear unit 133 (133a and 133b) that is rotatably connected to the vertical rotation motor 131. The first housing 113 containing the camera lens module 111 rotates vertically according to movement of the gear unit 133.

Referring to FIGS. 3 and 5, the horizontal rotation unit 150 includes a horizontal rotation motor 151 mounted on the upper surface of the top plate 101. A gear unit (not shown) includes a gear pan 310 that is connected to the horizontal rotation motor 151 and rotates the top plate 101. A motor circuit board 155, which is a movable circuit board, is installed under the lower surface of the top plate 101. On the motor circuit board 155, a connector socket 157 is connected to a coupling cable connector 165 at one end of an upper coupling cable 161 that constitutes a coupling cable 160.

The gear pan 310 is fixed to the upper surface of the middle plate 103 with a coupling screw 154. Gear teeth 311a are formed around the outer surface of the gear pan 310. Accordingly, as a pinion gear (not shown) connected to a motor shaft of the horizontal rotation motor 151 rotates horizontally along the gear teeth 311a, so does the top plate 101. Thus, the camera unit 110 rotates horizontally. The horizontal rotation motor 151 rotates with the top plate 101 during operation.

Referring to FIG. 3 again, the power unit 170 supplies power to the camera unit 110, the vertical rotation unit 130, and the horizontal rotation unit 150. The power unit 170 includes the bottom plate 171 and the power circuit board 173, which is a fixed circuit board installed above the bottom plate 171. On the power circuit board 173, a power socket 179 is adapted to be connected to an exterior power socket (not shown). A heat releasing fan 177 is installed on the bottom plate 171 to release heat generated during operation of the power circuit board 173. The insulator 175 is installed under the lower surface of the middle plate 103 for insulation from the power circuit board 173.

The above mentioned bottom plate 171 is installed on the inside bottom of the case body 230.

An exemplary configuration of connecting the rotating motor circuit board 155 and the power circuit board 173 is described hereinafter in more detail. The rotating motor circuit board 155 is connected to the power circuit board 173 fixed to the case body 230 without entanglement of the coupling cable 160 and supports rotation of the top plate 101.

Figure 6:
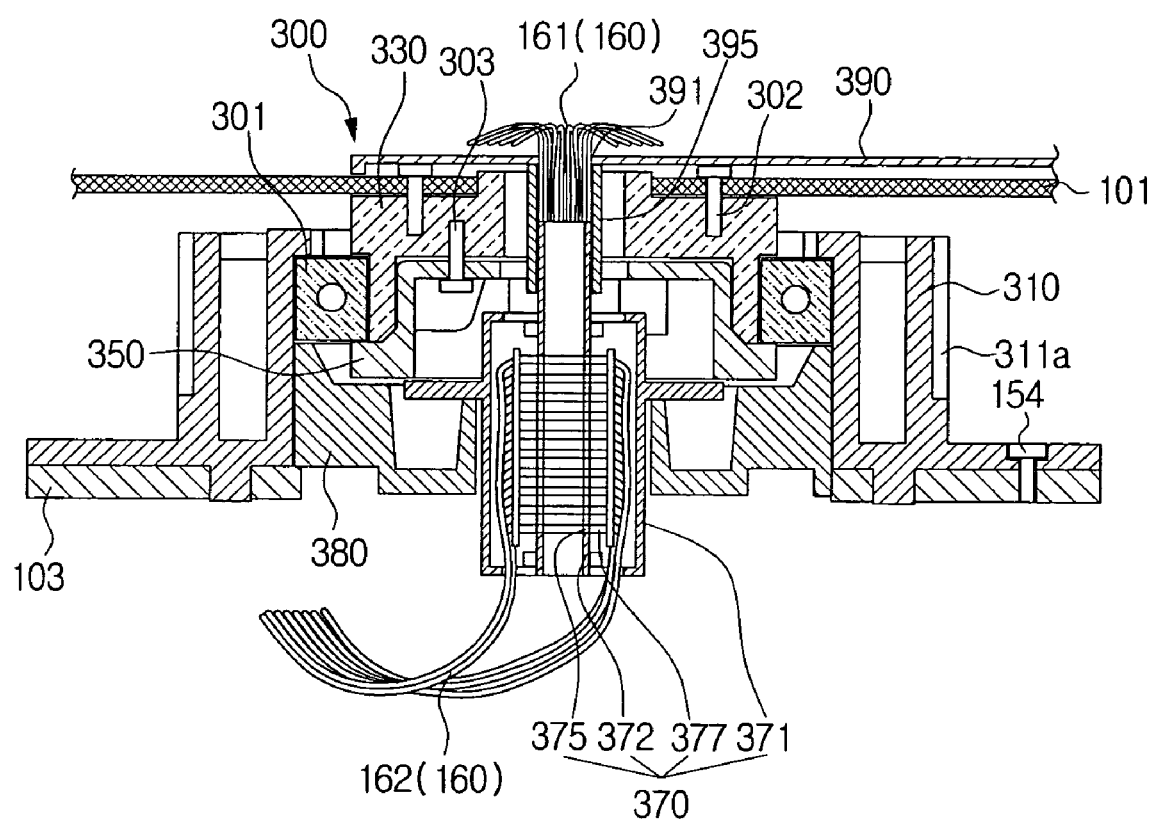
FIG. 6 is an elevational view in cross section a coupling unit according to an exemplary embodiment of the present invention.

FIG. 6 is a schematic sectional view that shows a composition of the coupling unit according to an exemplary embodiment of the present invention.

Referring to FIGS. 5 and 6, the coupling unit 300 includes a bearing 301 inserted in the gear pan 310. A bearing holder 330 is installed on the upper side of the bearing 301 and is connected to the top plate 101 with coupling screws 302. A cover bearing 350 is disposed partially beneath the lower side of the bearing 301 and is connected to the bearing holder 330 with coupling screws 303. The slip ring 370 is installed inside the cover bearing 350 and has both ends from which the upper coupling cable 161 and a lower coupling cable 162 of the coupling cable 160 are drawn. A slip ring holder 380 fixes the slip ring 370 inside the gear pan 310.

The slip ring 370 provides the structure in which the coupling cable 160 connects the rotating motor circuit board 155 and the fixed power circuit board 173 without being entangled. The slip ring 370 includes a slip ring main body 371 in which a rotational shaft 372 is installed. The rotational shaft 372 has a hollow cylindrical shape and a plurality of slider contact terminals 375 thereon. One end of the upper coupling cable 161 is connected with the slider contact terminal 375 inside the rotational shaft 372. Additionally, the lower coupling cable 162 is connected to the fixed contact terminal 377 disposed at the outer side of the rotational shaft 372 and connected with the slider contact terminals 375. The rotational shaft 372 rotates when the top plate 101 rotates, and the slider contact terminals 375 and the upper coupling cable 161 connected with the rotational shaft 372 rotate substantially simultaneously. During this time, the fixed contact terminal 377, the lower coupling cable 162 and the slip ring main body 371 remain stationary. One end of the upper coupling cable 161 is connected to the coupling cable connector 165 connected with the connector socket 157 on the motor circuit board 155.

Figure 7:
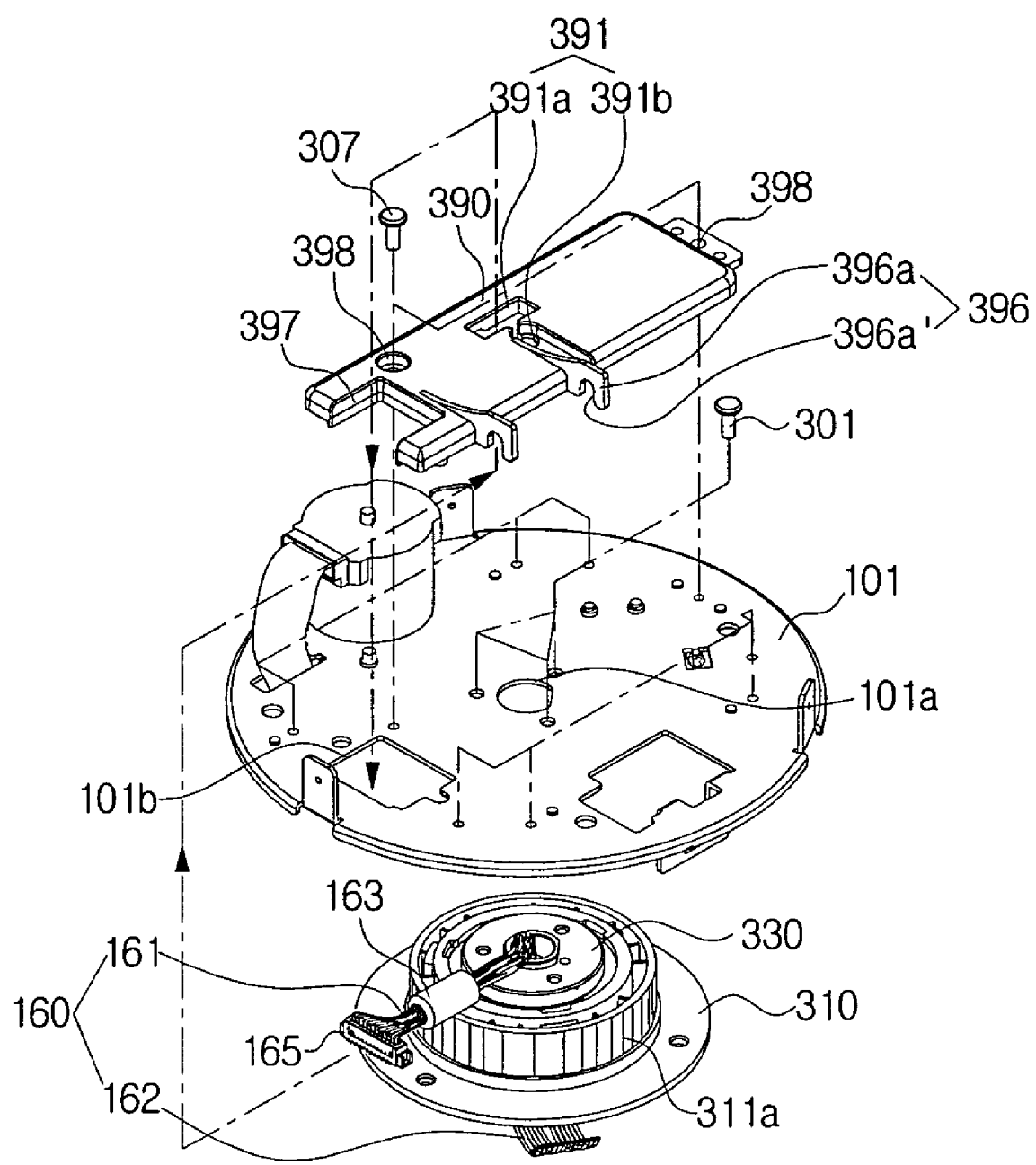
FIG. 7 is an exploded perspective view of a wire guide according to an exemplary embodiment of the present invention.
Figure 8:
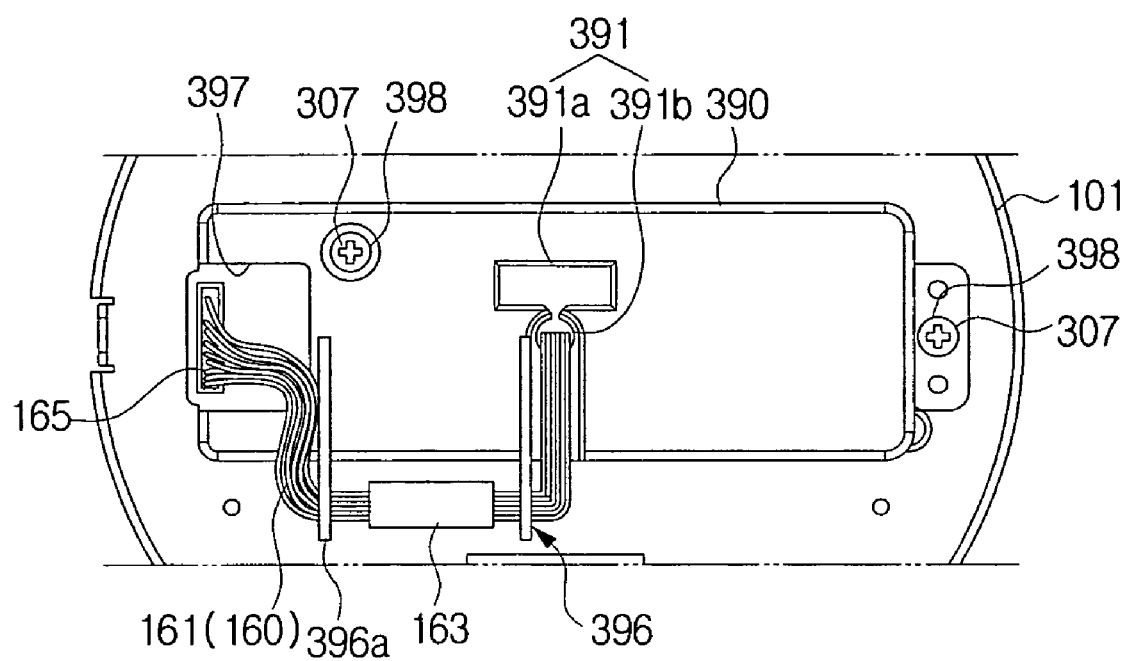
FIG. 8 is a partial top plan view of a wire guide installed according to an exemplary embodiment of the present invention.

FIG. 7 is an exploded perspective view of a wire guide according to an exemplary embodiment of the present invention. FIG. 8 is a partial top plan view of a wire guide according to an exemplary embodiment of the present invention.

Referring to FIGS. 7 and 8, a wire guide 390 is installed on the upper surface of the top plate 101 to substantially prevent movement of the upper coupling cable 161 drawn through opening 101a from the upper side of the top plate 101. The wire guide 390 has a wire drawing section 391 that draws the upper coupling cable 161 from its lower side to its upper side. The wire drawing section 391 has a drawing hole 391a that has substantially the same shape as the shape of the coupling cable connector 165 connected with one end of the upper coupling cable 161 and a supporting hole 391b that communicates with the drawing hole 391a.

Around the supporting hole 391b, a boss section 395 (see FIG. 6) is installed around the outer circumference of the rotational shaft 372 of the slip ring 370 and protrudes from the bottom surface of the wire guide 390.

A fixing section 396 is disposed at one side of the wire guide 390 to fix both sides of the coupling cable 160 around which a core 163 is inserted. In an exemplary implementation, the core 163 may be made of ferrite. The core 163 filters the noise generated in the coupling cable 160. The fixing section 396 is formed substantially perpendicularly to either side of the wire guide 390 and has a fixing rib 396a that has an insertion groove 396a' at its lower end. The coupling cable 160 (the upper coupling cable 161) is inserted into the insertion groove 396a'. The wire guide 390 is attached to the upper surface of the top plate 101 with a coupling screw 307 received by fastener hole 398. A penetrating section 397 is disposed at one side of the wire guide 390 to connect the coupling cable connector 165 drawn through the wire drawing section 391 and the connector socket 157 (see FIG. 5) on the motor circuit board 155. The connector socket 157 is exposed through a hole 101b (see FIG. 5) on the top plate 101.

The coupling cable connector 165 at one end of the upper coupling cable 161 connects the upper coupling cable to the connector socket 157 on the motor circuit board 155. The other end of the upper coupling cable is connected to a lower side of the power circuit board 173 through the penetrating holes 103a, 175a and 173a of the middle plate 103, the insulator 175 and the power circuit board 173 (see FIG. 3).

The security camera according to an exemplary embodiment of the present invention as described above has the advantage of substantially preventing movement of the core by fixing the coupling cable drawn from the upper surface of the top plate through the wire guide to the upper surface of the top plate.

The security camera according to an exemplary embodiment of the present invention also has an advantage in that the slip ring may rotate without sways because the boss section of the wire guide is installed around the rotational shaft of the slip ring and rotates with the slip ring.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus, comprising:
    a case body;
    a top plate rotatably installed at one side of the case body;
    a movable circuit board installed at one side of the top plate;
    a fixed circuit board installed in the case body;
    a camera unit installed at the other side of the top plate;
    a coupling cable connecting the movable circuit board and the fixed circuit board;
    a slip ring supporting the coupling cable without being influenced by rotation of the top plate; and
    a wire guide fixing the coupling cable drawn from the upper side of the top plate.

2. The apparatus according to claim 1, wherein the wire guide includes
    a wire drawing section passing the coupling cable; and
    a fixing section fixing the coupling cable passing through the wire drawing section to the upper surface of the top plate.

3. The apparatus according to claim 2, wherein
    the fixing section is substantially perpendicular to a side of the wire guide.

4. The apparatus according to claim 3, wherein
    the fixing section has a first fixing rib having an insertion groove at a lower end thereof, the insertion groove receiving the coupling cable.

5. The apparatus according to claim 4, wherein
    a core is inserted around the outer surface of the coupling cable drawn through the wire drawing section of the wire guide.

6. The apparatus according to claim 5, wherein
    a second fixing rib disposed at an interval to the first fixing rib, the first and second fixing ribs fixing the coupling cable.

7. The apparatus according to claim 6, wherein
    the core is made of ferrite.

8. The apparatus according to claim 2, wherein the wire drawing section includes
    a drawing hole that has a shape substantially corresponding to the shape of a coupling cable connector connected to one end of the coupling cable.

9. The apparatus according to claim 8, wherein the drawing section includes
    a supporting hole communicating with the drawing hole and supporting the coupling cable drawn through the drawing hole.

10. The apparatus according to claim 8, wherein the top plate includes
    a penetrating hole disposed at approximately a center of the top plate, and the supporting hole at a position substantially corresponding to the penetrating hole.

11. The apparatus according to claim 10, wherein
    a boss section around the supporting hole on the bottom surface of the wire guide, the boss section being inserted around a rotational shaft of the slip ring.

12. The apparatus according to claim 1, wherein the wire guide includes
    at least one coupling hole for passing a combining screw therethrough, and the combining screw connecting the wire guide to the top plate.

13. The apparatus according to claim 11, wherein the wire guide includes
    at least two coupling holes, each of the two coupling holes passing a combining screw for connecting the wire guide to the top plate, and the coupling holes are disposed at approximately opposing ends of the wire guide.

14. The apparatus according to claim 2, wherein
    the wire guide has a connector penetrating section at one side thereof; and
    the movable circuit board includes
        a connector socket; and
        a connector connected with one end of the coupling cable drawn through the wire drawing section is connected to the connector socket through the connector penetrating section.

15. An apparatus, comprising:
    a rotatable top plate installed in a case body;
    a movable circuit board installed on a first side of the top plate;
    a fixed circuit board installed in the case body;

a camera unit installed on a second side of the top plate;
a coupling cable connecting the movable circuit board and the fixed circuit board;
a slip ring supporting the coupling cable without being influenced by rotation of the top plate;
a wire guide that manages the coupling cable drawn from the upper side of the top plate; and
a ferrite core inserted around the outer surface of the coupling cable drawn through the wire drawing section of the wire guide.

16. The apparatus according to claim 15, wherein
the coupling cable passes through a wire drawing section in the wire guide and is managed with respect to the upper surface of the top plate by a plurality of fixing ribs extending from the wire guide.

17. The apparatus according to claim 16, wherein
at least two fixing ribs extend from the wire guide with the ferrite core disposed therebetween.

18. The apparatus according to claim 16, wherein
the wire guide has a connector penetrating section at one side thereof, and a connector connected with one end of the coupling cable drawn through the wire drawing section is connected to a connector socket on the movable circuit board through the connector penetrating section 19. The apparatus according to claim 15, wherein
the wire guide has coupling holes formed approximately at opposing ends of the wire guide through each of which a combining screw passes and connects the wire guide to the top plate.

20. The apparatus according to claim 16, wherein
a drawing hole that has a shape substantially corresponding to the shape of a coupling cable connector is connected to one end of the coupling cable;
a supporting hole communicates with the drawing hole and supports the coupling cable drawn through the drawing hole; and
a penetrating hole is formed approximately at a center of the top plate and the supporting hole is formed at a position substantially corresponding to the penetrating hole.

* * * * *